United States Patent
Okuhara et al.

(10) Patent No.: US 7,418,634 B2
(45) Date of Patent: Aug. 26, 2008

(54) REMOTE MONITORING SYSTEM AND REMOTE MONITORING METHOD

(75) Inventors: Koichi Okuhara, Nagano (JP); Osamu Ishibashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 579 days.

(21) Appl. No.: 11/084,062

(22) Filed: Mar. 21, 2005

(65) Prior Publication Data

US 2005/0246577 A1 Nov. 3, 2005

(30) Foreign Application Priority Data

Mar. 22, 2004 (JP) .......................... P2004-082706
Jan. 17, 2005 (JP) .......................... P2005-008685

(51) Int. Cl.
*G06F 11/00* (2006.01)
(52) U.S. Cl. .................. 714/44; 714/4; 714/48
(58) Field of Classification Search .............. 714/4, 714/44, 48
See application file for complete search history.

(56) References Cited

U.S. PATENT DOCUMENTS 5,727,135 A * 3/1998 Webb et al. ................. 358/1.14
2003/0063310 A1 * 4/2003 Nguyen et al. ............. 358/1.15

FOREIGN PATENT DOCUMENTS

JP 2003-163778 A 6/2003

* cited by examiner

*Primary Examiner*—Robert W Beausoliel, Jr.
*Assistant Examiner*—Charles Ehne
(74) *Attorney, Agent, or Firm*—Sughrue Mion, PLLC (57) ABSTRACT

A status information receiver is communicatively connected to at least one printing device via a network, and adapted to receive status information transmitted from the printing device. The status information is indicative of an operation state of the printing device. An error information detector is adapted to detect whether error information is included in the status information. The error information is indicative of an error occurred in the printing device. A repair information generator is adapted to generate repair information based on the error information. The repair information is indicative of an item in the printing device to be repaired.

6 Claims, 6 Drawing Sheets

| CLIENT SYSTEM (PRINTER) | REPAIR REQUEST INFORMATION | | | |
|---|---|---|---|---|
| | ERROR OCCURRING LOCATION | ERROR ITEM | ERROR OCCURRING TIME | PRIORITY OF ERROR |
| ABC CORPORATION XYZ OFFICE (LP-XXXX) | XXX | AAAA | 10:50 | RANK A |
| | | BBBB | 10:50 | RANK A |
| | | CCCC | 10:50 | RANK B |
| | ERROR OCCURRING LOCATION | ERROR ITEM | ERROR OCCURRING TIME | PRIORITY OF ERROR |
| | CCC | AAAA | XX:XX | RANK O |

REMOTE MONITORING SYSTEM AND REMOTE MONITORING METHOD

BACKGROUND OF THE INVENTION

The present invention relates to a remote monitoring system and a remote monitoring method, which monitor the operating status of a printer or the like-and detect an anomaly so that an engineer visits a remote location where a client owns a printer for repairing the printer when a failure has arisen in the printer or at the time of maintenance.

In the past, when a failure has arisen in a client's printer, the client makes a telephone call to report the nature of the failure. A call center passes the information on the nature of the failure to a dispatcher of a field service center. The dispatcher makes an arrangement for requesting a customer engineer (CE) to visit the client for repairs. The CE visits the location where the client's printer is placed for repairing the disabled printer. Japanese Patent Publication No. 2003-163778A discloses technique for preparing a report about details of an error and transmitting the report to the call center by facsimile transmission when such a device of the client has become broken down.

However, in the event of occurrence of a failure in the device, such as a printer, it is routine procedure for a person in charge in the call center to actively listen to the client about the status of the failure and make contact with the field service center, which is a department for actually repairing a client's device. Even in the field service center, the dispatcher must designate a CE in charge of the repair and make contact with that CE. As mentioned above, transmittal of information about the nature of the failure is repeated several times from the time the client has made a call until the CE is informed of the failure. For this reason, time is consumed by transmittal of information, and the accuracy of transmittal of information cannot be maintained.

If the status of the failure passed to the call center by the client is uncertain or lacking in explanation, the CE visits the client without ascertaining the true cause of the failure. Reaffirming the nature of the failure while talking with the client entails consumption of much time, or requires a re-visit of the CE to the client or the like. For these reasons, time and manpower are consumed from the time when the device, such as a printer, has broken down until repairing of the device is completed, which in turn adds to service cost.

SUMMARY OF THE INVENTION

It is therefore an object of the invention to provide a remote monitoring system and a remote monitoring method, which enable immediate and appropriate acquisition of required repair request information after occurrence of a failure, thereby shortening the time from occurrence of the failure until completion of the repair, and provision of efficient service.

In order to achieve the above object, according to the invention, there is provided a remote monitoring system, comprising:

a status information receiver, communicatively connected to at least one printing device via a network and adapted to receive status information transmitted from the printing device, the status information being indicative of an operation state of the printing device;

an error information detector, adapted to detect whether error information is included in the status information, the error information being indicative of an error occurred in the printing device; and a repair information generator, adapted to generate repair information based on the error information, the repair information being indicative of an item in the printing device to be repaired.

With this configuration, there can be provided a repair service quickly and efficiently when an error is occurred in a printing device located at a remote place.

Preferably, the remote monitoring system further comprises a printing device identifier, adapted to identify one of a plurality of printing devices from which the status information including the error information is transmitted.

Preferably, the remote monitoring system further comprises an error item identifier, adapted to identify one of a plurality of predetermined error items which corresponds to the error indicated by the error information.

Here, it is preferable that the remote monitoring system further comprises a storage in which priority level information of each of the error items are stored. The error item identifier appends the priority level information corresponding to the identified error item to the error information.

With this configuration, the repair service can be efficiently provided in accordance with the priority level of the error.

Here, it is further preferable that the repair information generator incorporates the error information having the priority level information which indicates a higher priority than a predetermined threshold level, into the repair information.

With this configuration, the repair service can be efficiently provided with respect to a serious error.

Preferably, the error information indicates a location in the printing device where the error is occurred. The repair information generator incorporates the error information into the repair information based on the location indicated thereby.

With this configuration, since the error item can be recognized on the basis of the location within the printing device, it is possible to d easily and quickly determine parts required for the repair service.

Preferably, the repair information generator is adapted to transmit the repair information to a terminal device equipped in a place having a duty to repair the printing device.

With this configuration, it is possible to certainly and quickly provide the repair information to a staff who actually repairs the printing device.

Preferably, the repair information generator is adapted to transmit the repair information to a terminal device equipped in a place having a duty to receive an error report of the printing device from a client.

With this configuration, it is possible to certainly and quickly provide the repair information to a staff who directly talks with the client. In this case, more efficient repair service can be provided because the staff can provide solutions for non-serious errors by way of the direct communication with the client.

According to the invention, there is also provided a remote monitoring method, comprising steps of:

receiving status information transmitted from at least one printing device via a network, the status information being indicative of an operation state of the printing device;

detecting whether error information is included in the status information, the error information being indicative of an error occurred in the printing device; and generating repair information based on the error information, the repair information being indicative of an item in the printing device to be repaired.

Preferably, the remote monitoring method further comprises steps of:

storing priority level information of each of the error items;

identifying one of a plurality of predetermined error items which corresponds to the error indicated by the error information; and appending the priority level information corresponding to the identified error item to the error information.

Here, it is preferable that the error information having the priority level information which indicates a higher priority than a predetermined threshold level is incorporated into the repair information.

Preferably, the error information indicates a location in the printing device where the error is occurred. The error information is incorporated into the repair information based on the location indicated thereby.

According to the invention, there is also provided a storage medium containing a program for causing a computer to execute the above remote monitoring method.

BRIEF DESCRIPTION OF THE DRAWINGS

The above objects and advantages of the present invention will become more apparent by describing in detail preferred exemplary embodiments thereof with reference to the accompanying drawings, wherein:

FIG. 2 is a chart showing an example of status information output from a printer shown in. FIG. 1;

DETAILED DESCRIPTION OF THE INVENTION

Embodiments of the present invention will be described below in detail with reference to the accompanying drawings.

The present embodiment describes an example where, with an apparatus handled by a client being taken as a client system, the status of a printing device (printer) constituting a portion of the client system is remotely monitored, thereby effecting repair and maintenance service of the printer.

Figure 1:
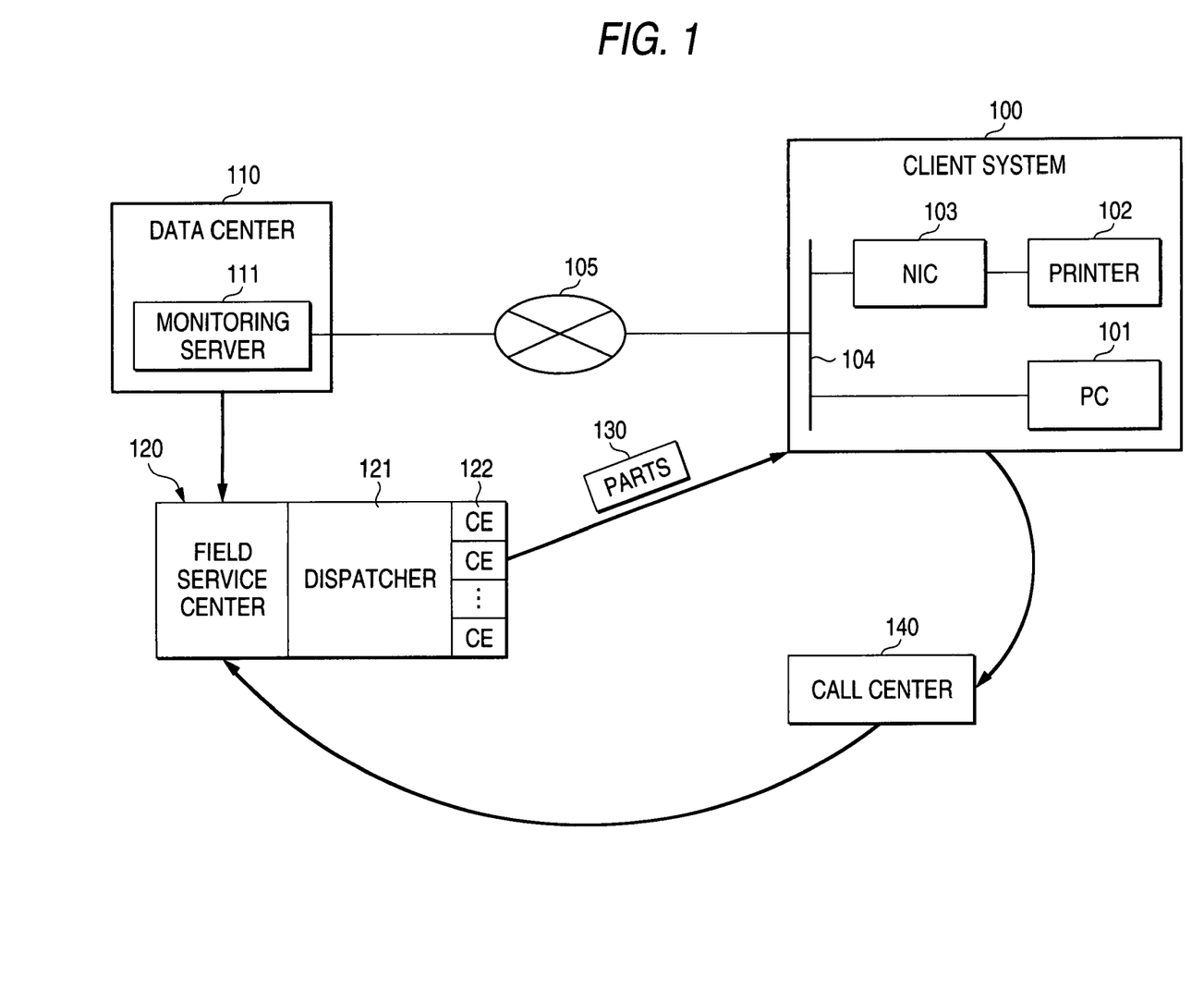
FIG. 1 is a block diagram of a remote monitoring service system according to one embodiment of the present invention.

As shown in FIG. 1, a client system 100 comprises a personal computer (PC) 101 and a printer 102. In addition to a laser printer or an ink jet printer, a hybrid machine having scanner and printer functions or the like is used as the printer 102. This printer 102 is connected to a network 104, such as a LAN, by way of a network interface card (NIC) 103. The network 104 is connected to an external network 105, such as the Internet, by way of an unillustrated proxy server.

Such a client system 100 is provided on a per-client basis, and a plurality of unillustrated client systems 100 are similarly connected to the network 105. The respective client systems 100 are connected to a monitoring server 111 of a data center 110 by way of the network 105. The monitoring server 111 set in the data center 110 monitors Me operating statuses of the printers 102 of the respective client systems 100.

The printer 102 provided in the client system 100 detects its own operating status (status information) and transmits the status information to the monitoring server 111 by way of the networks 104, 105. When having detected that the status information includes error information required to effect repair, the monitoring server 111 outputs repair request information which indicates that the client system 100 (the printer 102) requires a repair.

A field service center 120 is a department which takes charge of periodic maintenance of the printer 102 or a repair when the printer has become broken down. On the basis of information about occurrence of a repair output from the monitoring server 111, the field service center 120 effects a repair of the printer 102 concerned. When the printer 102 requires a repair, a dispatcher 121 acquires the repair request information output by the monitoring server 111; presumes a requirement of the repair, such as a section to be repaired; selects a part 130 to be used for repair; and selects a customer engineer (CE) 122 who is to take charge of the repair of the printer 102 concerned. The selected CE 122 visits a location where the client system 100 is set, with the part 130 required for repairing the printer 102. Presumption of the location of a repair and selection of the part 130, which are performed by the dispatcher 121, may be performed by the CE 122.

In the event of a failure in the printer 102, a request for repair can also be made by making contact through use of a conventionally-provided telephone. A call center 140 is a department for receiving contacts made by the clients over the phone. Upon receipt of a call of a failure in the printer 102 from a client, the call center 140 issues a request for repair to the field service center 120. Subsequently, the CE 122 visits and repairs the printer 102 in the same manner as mentioned the above.

Figure 2:
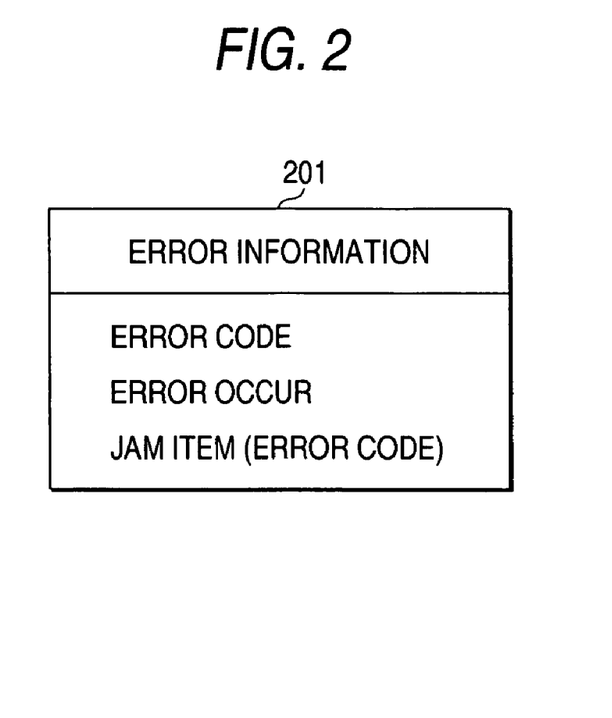

FIG. 2 shows an example of the status information issued from the printer 102. In this example, only error information 201 is extracted as status information. The error information 201 includes an error code used for specifying the item of the error having arisen, an error occurrence time, and jam items (codes). Since a jam of print paper arises relatively frequently in the printer 102, the jam item is included in the error information 201. The jam item is imparted with a code which changes according to the location of an anomaly where a jam of print paper has arisen. In addition to the jam item, the status information includes the number of prints, a paper size, depletion information about an expendable item, or the like.

Figure 3:
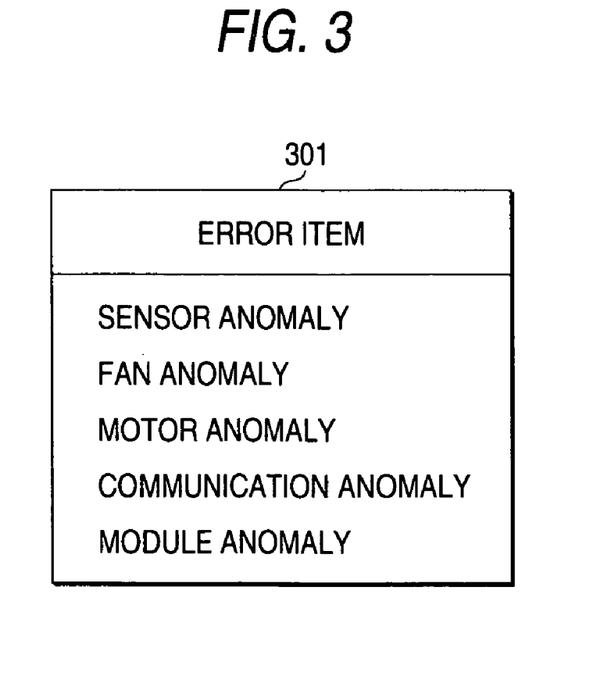
FIG. 3 is a chart showing details of an error corresponding to an error code shown in FIG. 2.

As shown in FIG. 3, items of the error 301 (hereinafter called "error items") are specific information to be detected by a paper feeding section, a printing section (engine), and a paper ejecting section of the printer 102. As illustrated, the error item is generated from various anomalies, such as a sensor anomaly, a motor anomaly, a communication anomaly, and a module anomaly.

The error information 201 is stored in a storage, such as ROM provided within the printer 102, and transmitted to a display of the printer 102 or the PC 101 by way of the network 104 when an error has arisen. Concurrently, the error information 201 is transmitted to the monitoring server 111 by way of the network 104, as well.

Figure 4:
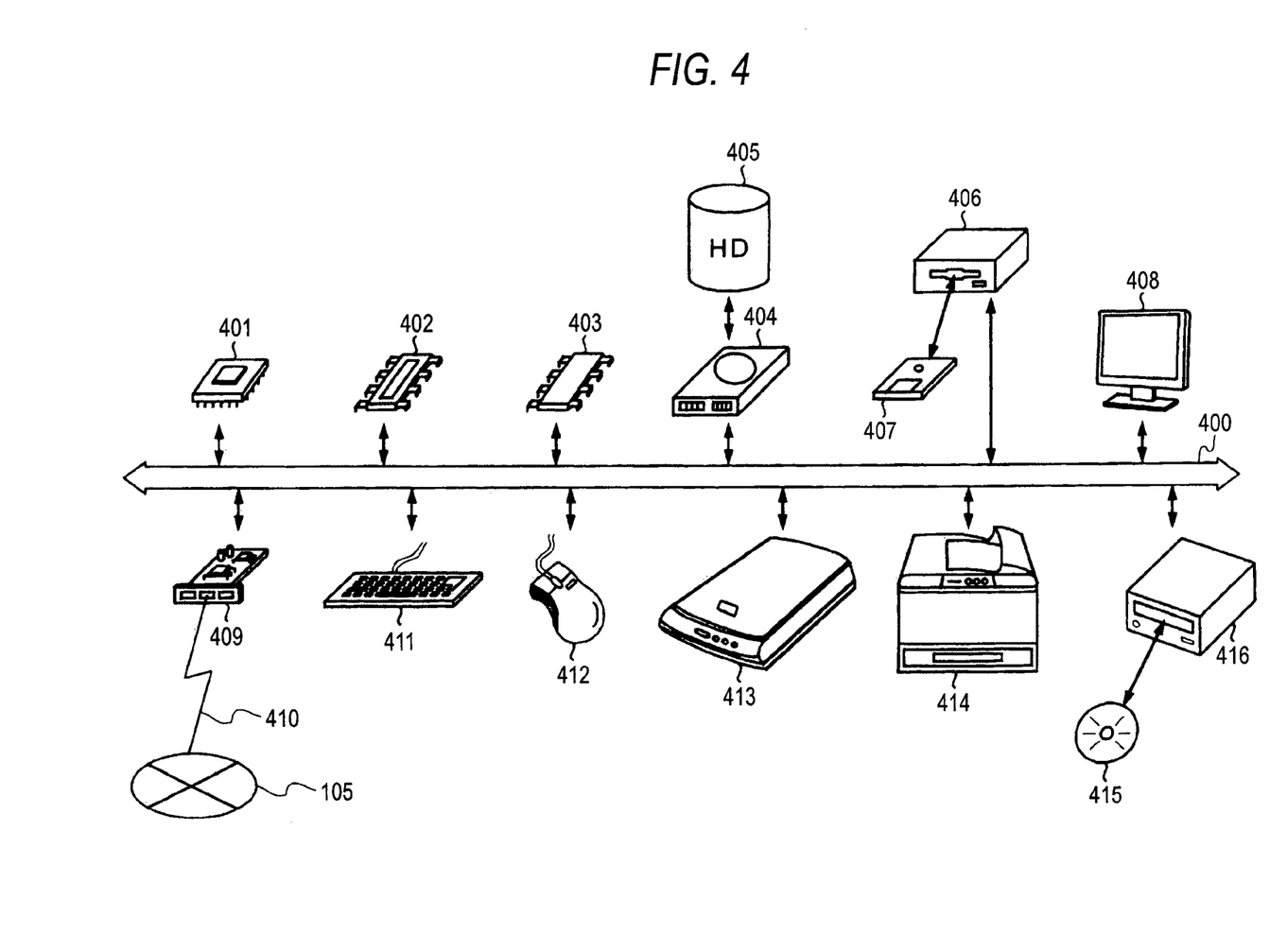
FIG. 4 is a block diagram showing the hardware configuration of the remote monitoring service system of FIG. 1.

In FIG. 4, reference numeral 401 designates a CPU for controlling the overall system; 402 designates ROM into which a basic input/output program is stored; and 403 designates RAM used as a work area of the CPU 401. Reference numeral 404 designates an HDD (hard disk drive) which controls reading/writing of data from/into an HD (hard disk) 405 under control of the CPU 401; and 405 designates the HD which stores the data written under control of the HDD 404.

Reference numeral 406 designates an FDD (floppy disk drive) for controlling reading/writing of data from/into an FD (floppy disk) 407 under control of the CPU 401. Reference numeral 407 designates a removable FD which stores the data written under control of the FDD 406. Reference numeral 408 designates a display which displays a cursor, menus, windows, and various data such as letters or images; and 409 designates a network board which is connected to the network 105 by way of a communications cable 410 and acts as an interface (I/F) between the network 105 and the CPU 401.

Reference numeral 411 designates a keyboard equipped with a plurality of keys used for inputting letters, numerals, or various commands; and 412 designates a mouse which selects and executes various commands, selects an object of processing, and moves the cursor. Reference numeral 413 designates a scanner which optically reads letters and images; 414 designates a printer which prints letters or images under control of the CPU 401; 415 designates a removable recording medium CD/DVD; 416 designates a disk drive which controls reading of data from the CD/DVD disk 415; and 400 designates a bus for interconnecting the individual sections set forth.

The monitoring server 111 shown in FIG. 1 has the functions shown in FIG. 4. Processing functions of the monitoring server 111 for occurrence of an error are implemented as a result of the CPU 401 executing programs recorded in the ROM 402, the RAM 403, the CD/DVD 415, and the disk drive 416, which are provided for the monitoring server 111. The function of the PC 101 of the client system 100 shown in FIG. 1 is also implemented as a result of the CPU 401 executing programs recorded in the ROM 402, the RAM 403, the CD/DVD 415, and the disk drive 416, which are shown in FIG. 4. A specific configuration for connecting the monitoring server 111 shown in FIG. 1 to the client systems 100 by way of the network and exchanging data between the monitoring server and the client systems is realized by the I/F 409 shown in FIG. 4.

Figure 5:
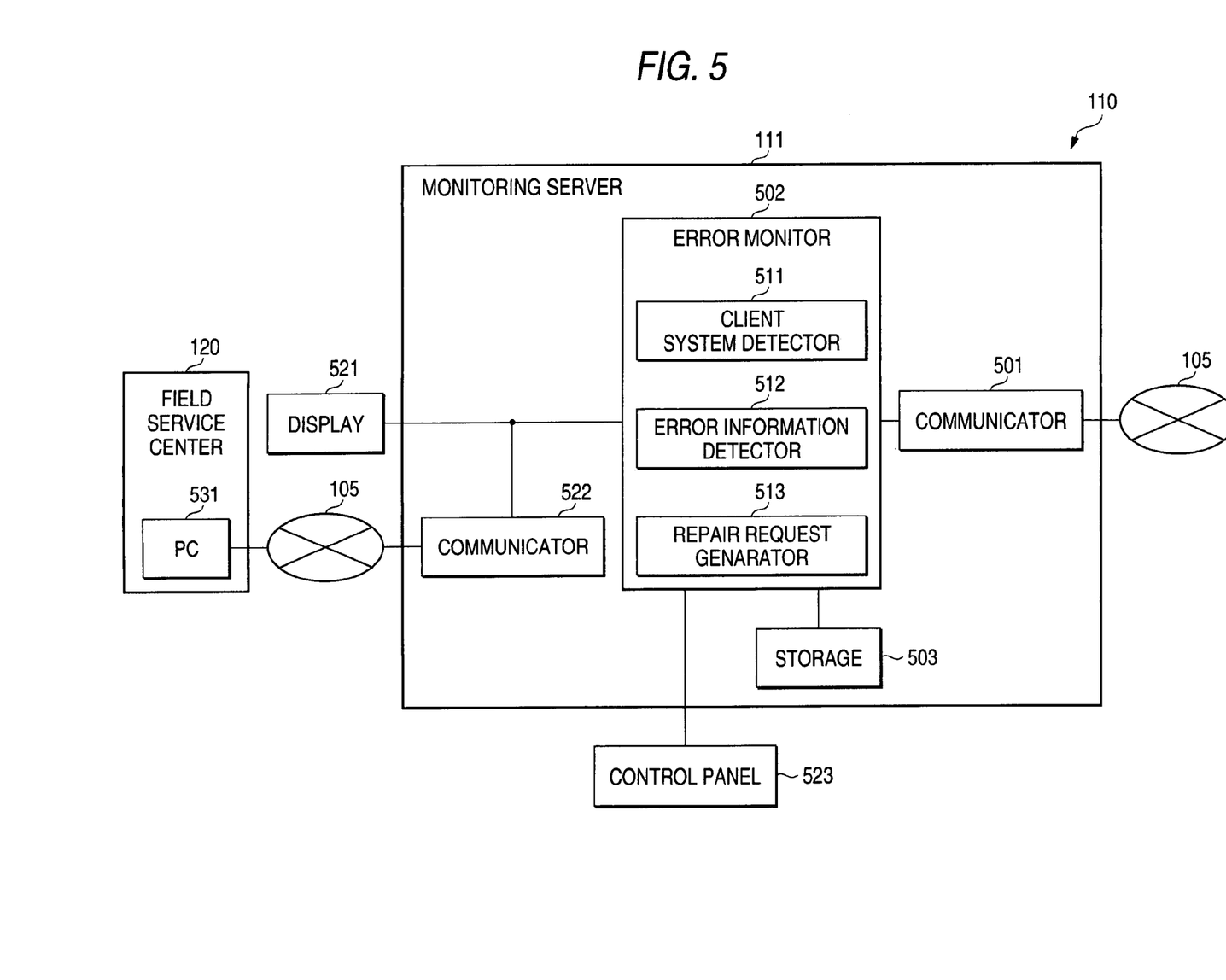
FIG. 5 is a block diagram showing the internal functions of a monitoring server shown in FIG. 1.

As shown in FIG. 5, a communicator 501 is provided in the data center 110 to receive the status information by way of the network 105 and relays the status information to the monitoring server 111. The monitoring server 111 comprises an error monitor 602 which further comprises a client system detector 511, an error information detector 512, and a repair request generator 513. A storage 503 for storing and retaining details of setting is connected to the error monitor 502.

On the basis of received status information, the client system detector 511 detects the client system 100 that has sent the status information. The error information detector 512 detects specific details of an error on the basis of the error information included in the received status information. The repair request generator 513 determines whether or not a repair is required, on the basis of the error item detected by the error information detector 512, and repair request information is output when a repair is required. The repair request information output by the repair request generator 513 when a repair is required is output to a display 521. This repair request information can be printed and output from an unillustrated printing device such as a printer.

The display 521 may be embodied as the display 408 shown in FIG. 4, and can display the repair request information on the display 408. There can also be adopted a configuration such that the repair request information is transmitted to a terminal (e.g., a PC) set in the field service center 120 by way of a communicator 522 and the network 105. The communicators 501, 522 can be configured through use of the I/F 409 shown in FIG. 4. Setting and operation required to perform error processing of the monitoring server 111 are performed through use of a control panel 523, or the like.

Figure 6:
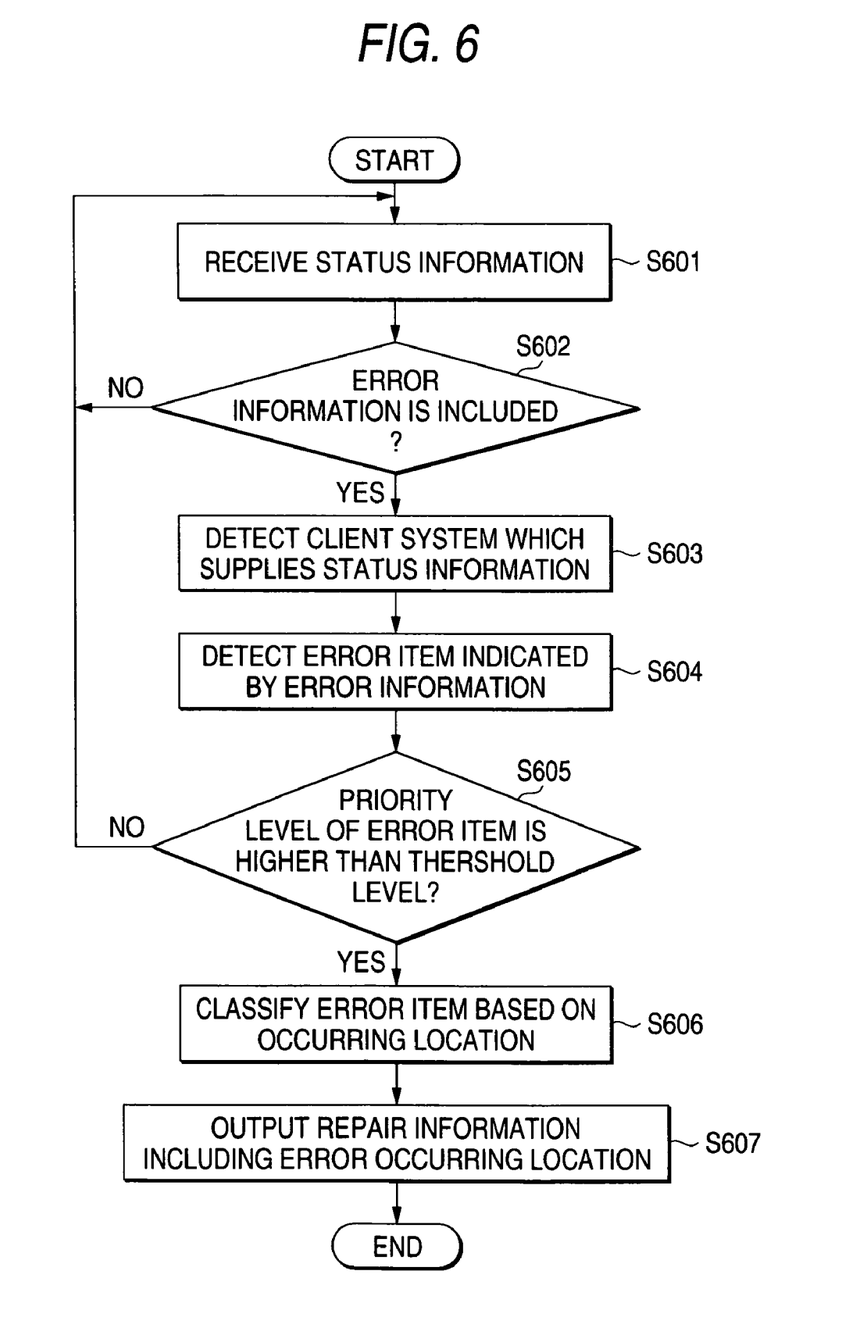
FIG. 6 is a flowchart showing an error item monitoring operation to be performed by the monitoring server of FIG. 5.

Processing to be performed by the error monitor 502 provided in the monitoring server 111 is shown in FIG. 6. The printer 102 of the client system 100 transmits status information upon occurrence of a failure. The status information can also be transmitted at given time intervals regardless of occurrence of a failure. In the embodiment, an operation status is always transmitted as status information at given time intervals. The error monitor 502 of the monitoring server 111 receives the status Information (step S601). The error information detector 512 detects whether or not the status information includes the error information (step S602). Specifically, error information presumed to require a repair is extracted from among error information items about the number of prints, a paper size, expendables, or the like. As a result, only the information required for error monitoring processing can be extracted from the status information items in which various information items are mixedly present.

When the status information includes error information (YES in step S602), the client system detector 511 detects the client system 100 (the printer 102) which has transmitted the status information transmitted (step S603). Information about the source of status information is set in advance in the status information, and a transmission destination is detected by reading information about the transmission source. Meanwhile, when the error information is not included in the status information (NO in step S602), the following error monitoring operation is not performed, Processing returns to step S601, where receipt of new status information is awaited. The client system 100 is provided in numbers determined on a per-client basis and connected to the network 105. Therefore, the monitoring server 111 receives the error information included in the status information originating from the plurality of client systems 100, and must determine which one of the client systems 100 has transmitted the error information. The client system detector 511 reads information about the transmission source and detects the transmission destination, thereby solving the problem.

After execution of processing pertaining to step S603, the error information detector 512 detects the error item indicated by the error information (step S604); specifically, which one of anomalies shown in the error item 301 shown in FIG. 3 corresponds to the error. Subsequently, the priority of the detected error is detected (step S605). A priority is set in a plurality of levels for each error in advance in the storage 503 shown in FIG. 5. The error information detector 512 detects the priority of the error by reference to settings in the storage 503. The priority of the detected error is assigned to every error 301, in accordance with its item. A high priority of an error implies a high degree of necessity for a repair. By classifying locations where errors have arisen, the location of occurrence of an error having a high priority becomes clear. As will be described later, the dispatcher 121 or the CE 122 can readily specify a location 711 where the anomaly has arisen (hereinafter simply called an "anomaly occurrence location").

Subsequently, when the priority of the detected error is higher than a predetermined level (YES in step S605), errors are classified according to the location where an error has arisen (step S606). The location where errors have arisen are classified and set in the storage 503 in advance on a per-error basis. The error information detector 512 classifies the errors detected by reference to the settings of the storage 503 according to the locations where the errors have arisen. When the priority of the detected error is lower than a predetermined level (NO in step S605), processing returns to step S601 without execution of subsequent processing.

Next, the repair request generator 513 outputs repair request information pertaining to the errors classified in step S606, in accordance with the locations where the errors have arisen (step S607). The repair request information is formed by arranging, in the form of a list, the errors classified according to the locations where the errors have arisen. The repair request information arranged in the form of a list is output to the display 521 or a communicator 522.

In the foregoing processing, the priority of an error is determined. Repair request information is not output for an error having a low priority. However, it may be the case that all of the errors are output as repair request information regardless of whether the priority of an error is high or low. In this case, the dispatcher 121 and the CE 122 of the field service center 120 can acquire all of the errors as repair request information, and the repair request information can be applied to analysis of a failure of the overall printer 102.

Figure 7:
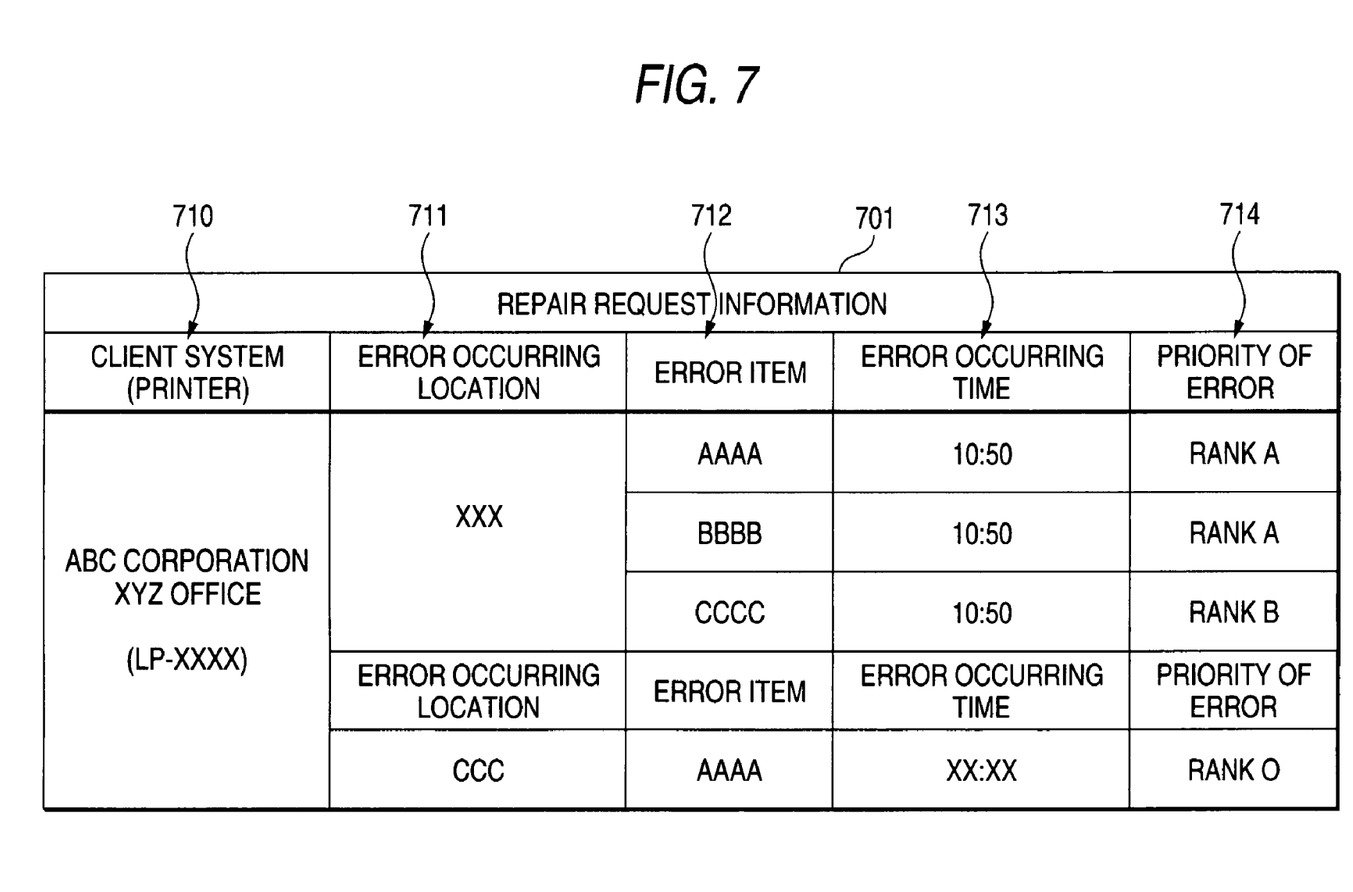
FIG. 7 is a list showing an example of repair request information.

FIG. 7 is a fist showing an example of repair request information. Repair request information 701 is output to the display 521 shown in FIG. 5 to be displayed thereon. As illustrated, the repair request information 701 comprises information 710 about the client systems 100 (printers 102); anomaly occurrence locations 711 where anomalies have arisen in the printer 102; error items 712 classified according to the anomaly occurrence locations 711; an error occurrence time 713; and the priority of an error 714. As mentioned above, the errors 712 are classified according to locations where anomalies have arisen, whereby the errors 712 having arisen in the anomaly occurrence locations 711 can be made clear. In the illustrated example, the errors 712 are sorted in ascending order of priority of the error 714, so that the priority of the error can be readily ascertained.

The dispatcher 121 or the CE 122 of the field service center 120 can specify the location 711 where anomalies have arisen in the client system 100 (printer 102), on the basis of the details of the repair request information 701. The part 130 required for required the location 711 where an anomaly 130 has occurred (see FIG. 1) can be readily estimated. The repair request information 701 is described in the same column while the errors 712 are associated with the error occurrence time 713. As a result, items of the error can be accurately specified on the basis of the time 711 when a certain anomaly has arisen, and selection of the part 130 can be performed more accurately. For instance, as illustrated, when a plurality of errors have arisen in a certain anomaly occurrence location 711 substantially at the same time or simultaneously within a short period of time, the nature of the failure having arisen in the anomaly occurrence location 711 are specified, thereby enabling accurate selection of the required part 130.

The printer 102 described in connection with the embodiment is configured so as to transmit the operating status to the monitoring server 111 of the data center 110 as status information at all times. In addition to this, storage, such as ROM, for storing status information is provided within the printer 102, thereby storing the history of status information. Use of such a printer 102 enables transmission of the history of status information to the monitoring server 111. In response to this, the monitoring server 111 can output error information included in the status information in the past in the form of a list simultaneously with output of the repair request information 701. As a result, the dispatcher 120 or the CE 122 of the field service center 120 can refer to me history of errors having occurred in the past. The nature of a failure can be specified, and the required parts 130 can be selected accurately.

In the above embodiment, the field center 120 is configured such that the monitoring server 111 dispatches the CE 122 to immediately perform repair on the basis of the error information included in the status information. In addition, after the client has submitted to the call center 140 a failure report or a request for a repair, the field service center 120 examines the nature of a repair on the basis of the error information received by the monitoring server 111, and can also dispatch the CE 122 to repair the printer 102, as required. As a result, only when the client desires a repair, the CE 122 can be caused to visit the client Specifically, the repair request information 701 can be made to impart, as an identifier, information about whether or not the call center 140 has received a request for repair from the client of the client system 100 concerned. A terminal (e.g., a PC) connectable to the monitoring server 111 is set in advance in the call center 140. Upon receipt of a request for repair from the client, the call center 140 imparts, to the repair request information 701 about the client system 100 concerned, an identifier indicating that the request for repair has been received, As a result, the field service center 120 can ascertain that the request is a request for repair, by reference to the identifier affixed to the repair request information 701. The only requirement is that the CE visits the location where the client system 100 is set after having confirmed attachment of the identifier. Even when the request for repair is not sent from the client, the CE 122 is considered-to ascertain occurrence of a failure and to inform the client of occurrence of the failure and dispatch the CE for repair.

The monitoring server 111 can also be configured to send the repair request information 701 to the terminal set in the call center 140. Thereby, the call center 140 can acquire the repair request information about the broken client system 100. For instance, the monitoring server 111 has transmitted, to the call center 140, the repair request information 701 (see FIG. 7) imparted with the priority 714 of the error. Thereby, when the client later issues a request for repair by telephone, the call center 140 can provide an appropriate response in accordance with the priority 714 of the error. For instance, among errors such as a jam in the printer 102 or paper jam, an error having a low priority 714 can also be resolved by appropriately transmitting a pertinent solution to the client through only a call for communication. In this case, a wasteful visit by the CE 122 can also be prevented.

According to the embodiments described thus far, the CE 122 of the field service center 120 that actually repairs the client system 100 (the printer 102) can quickly and accurately ascertain details of a failure. As a result, a time that elapses from when the client system 1000 has broken down until an actual repair is started can be shortened. The part 130 required for replacement in the event of occurrence of a failure is accurately selected on the basis of detection of a location where an anomaly has arisen at the time of an error, and only a required component can be brought.

Particularly, in the case where the printer 102 is a large-size printer for business purpose, the part 103 per se tends to become larger, thereby making efficient selection and transport of the part 130. Such a printer 102 is likely to cause a failure in association with mechanical operation, such as feeding of print paper, printing operation, and output of the paper. However, even when replacement of the parts 103 of a large mechanism is required as a result of the printer 102 having broken down, preparation of the appropriate part 130 can be performed by monitoring the operating status of the printer 102 at a remote location, thereby enabling an appropriate, efficient response at the time of occurrence of a failure. Actual repairing operation can be completed within a short period of time by accurately grasping the location of a failure. As mentioned above, a response to a failure can be performed efficiently within a short period of time that elapses from occurrence of a failure in the client system 100 until completion of the repair.

Since the client system 100 (the printer 102) transmits the status information directly to the external monitoring server 111, a phenomenon which is not perceived as a failure by a client or a phenomenon which is misunderstood by the client, such as a case where an error having a low priority resolved by the client arises frequently, can also be detected even when the client system 100 is not broken.

The embodiment has described processing on the premise of occurrence of a failure in the printer 102. The printer 102 continuously outputs status information during a period in which the printer 102 operates, and the monitoring server 111 can monitor the status information. Consequently, the monitoring server 111 similarly monitors periodic maintenance of the printer 102 or replenishment of expendables during periods of time other than the period of time when the printer 102 has become broken.

The printer 102 constituting a part of the client system 100 described in connection with the embodiment can be applied to overall printers, such as compact laser beam printers, large-size laser beam printers, or ink jet printers, which produce print outputs using print paper. Moreover, the present invention can be applied to a hybrid machine having a scanner function for reading an original document in addition to having a printing function.

A method pertaining to remote monitoring described in connection with the above-described embodiment can be realized by a computer, such as a personal computer or a workstation, executing a previously-prepared program. The program is recorded on a computer-readable recording medium, such as a hard disk, a floppy disk, a CD-ROM, an MO, or a DVD, and is executed by the computer reading the program from the recording medium. This program may also be a transmission medium that can be distributed over a network such as the Internet

What is claimed is:

1. A remote monitoring system, comprising:
   a status information receiver, communicatively connected to at least one printing device via a network, and adapted to receive status information transmitted from the printing device, the status information being indicative of an operation state of the printing device;
   an error information detector, adapted to detect whether error information is included in the status information, the error information being indicative of an error occurred in the printing device, a location in the printing device where the error is occurred, and a time when the error is occurred;
   a printing device identifier, adapted to identify one of a plurality of printing devices from which the status information including the error information is transmitted;
   a storage in which priority level information of each of error items are stored;
   an error item identifier, adapted to identify one of the error items which corresponds to the error indicated by the error information, and adapted to append the priority level information corresponding to the identified error item to the error information; and
   a repair information generator, adapted to generate repair information based on the error information, and adapted to transmit the repair information to a terminal device equipped in a place having a duty to receive an error report of the printing device from a client, the repair information being indicative of an item in the identified printing device to be repaired, wherein
   in the repair information, the error item is classified according to the location, is associated with the time, and is sorted in ascending order of priority based on the priority level information,
   the terminal device appends information being indicative that the error report has been received from the client, into the repair information.

2. The remote monitoring system as set forth in claim 1, wherein the repair information generator incorporates the error information having the priority level information which indicates a higher priority than a predetermined threshold level, into the repair information.

3. The remote monitoring system as set forth in claim 1, wherein the repair information generator is adapted to transmit the repair information to a terminal device equipped in a place having a duty to repair the printing device.

4. A remote monitoring method, comprising steps of:
   receiving status information transmitted from at least one printing device via a network, the status information being indicative of an operation state of the printing device;
   detecting whether error information is included in the status information, the error information being indicative of an error occurred in the printing device, a location in the printing device where the error is occurred, and a time when the error is occurred;
   identifying one of a plurality of printing devices from which the status information including the error information is transmitted;
   storing priority level information of each of error items;
   identifying one of the error items which corresponds to the error indicated by the error information;
   appending the priority level information corresponding to the identified error time to the error information;
   generating repair information based on the error information; and
   transmitting the repair information to a terminal device equipped in a place having a duty to receive an error report of the printing device from a client, the repair information being indicative of an item in the identified printing device to be repaired, wherein
   in the repair information, the error item is classified according to the location, is associated with the time, and is sorted in ascending order of priority based on the priority level information, and
   the terminal device appends information being indicative that the error report has been received from the client, into the repair information.

5. The remote monitoring method as set forth in claim 4, wherein the error information having the priority level information which indicates a higher priority than a predetermined threshold level is incorporated into the repair information.

6. A storage medium containing a program for causing a computer to execute the remote monitoring method as set forth in claim 4.

* * * * *